Sept. 4, 1951　　　　　J. VAN BUREN　　　　　2,567,041
MACHINE FOR CUTTING AND SPACING SOAP CAKES
Filed March 23, 1949　　　　　　　　　　　6 Sheets-Sheet 1
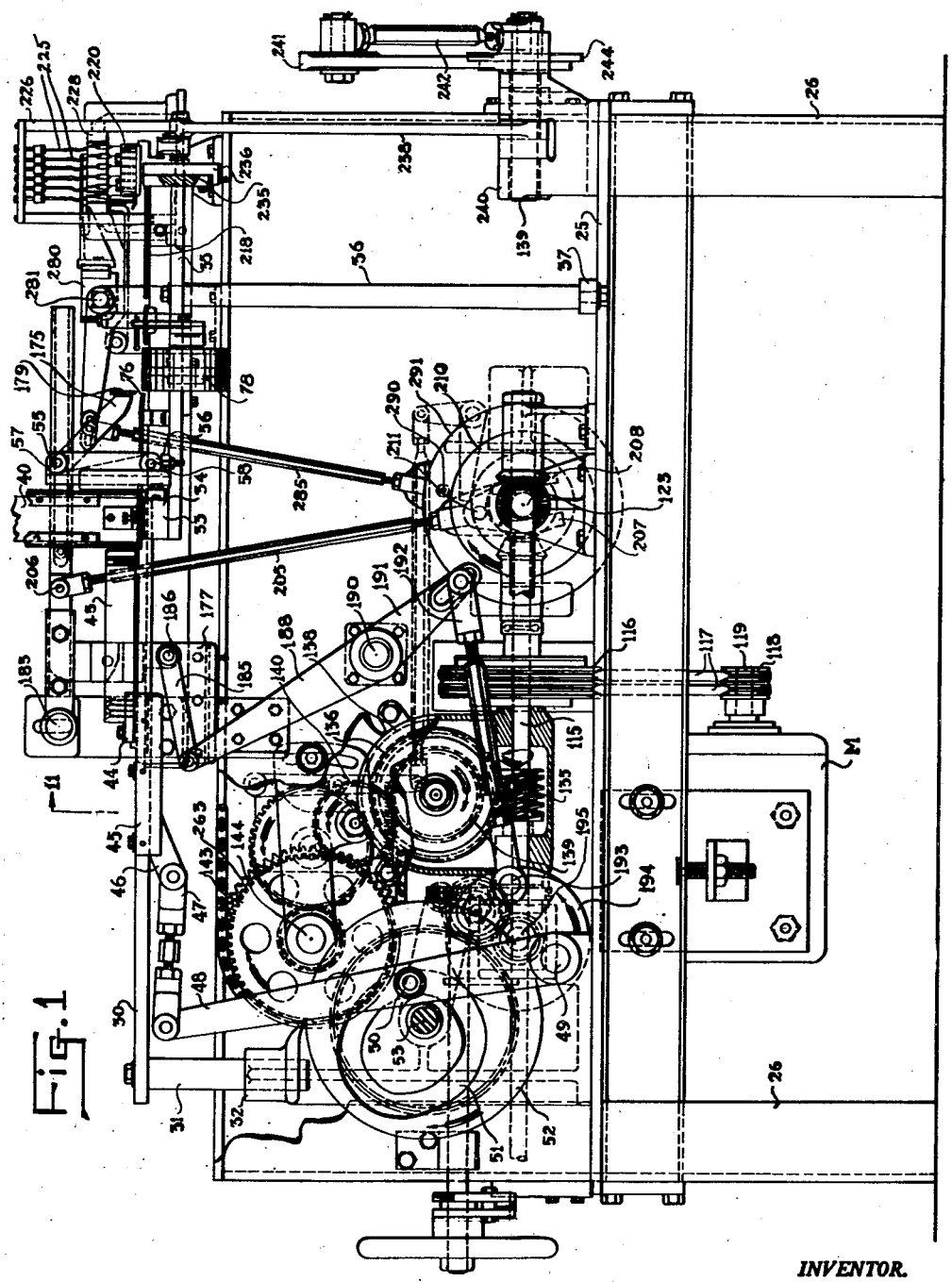
INVENTOR.
JOHN VAN BUREN
BY
ATTY.

Sept. 4, 1951  J. VAN BUREN  2,567,041
MACHINE FOR CUTTING AND SPACING SOAP CAKES
Filed March 23, 1949  6 Sheets-Sheet 2
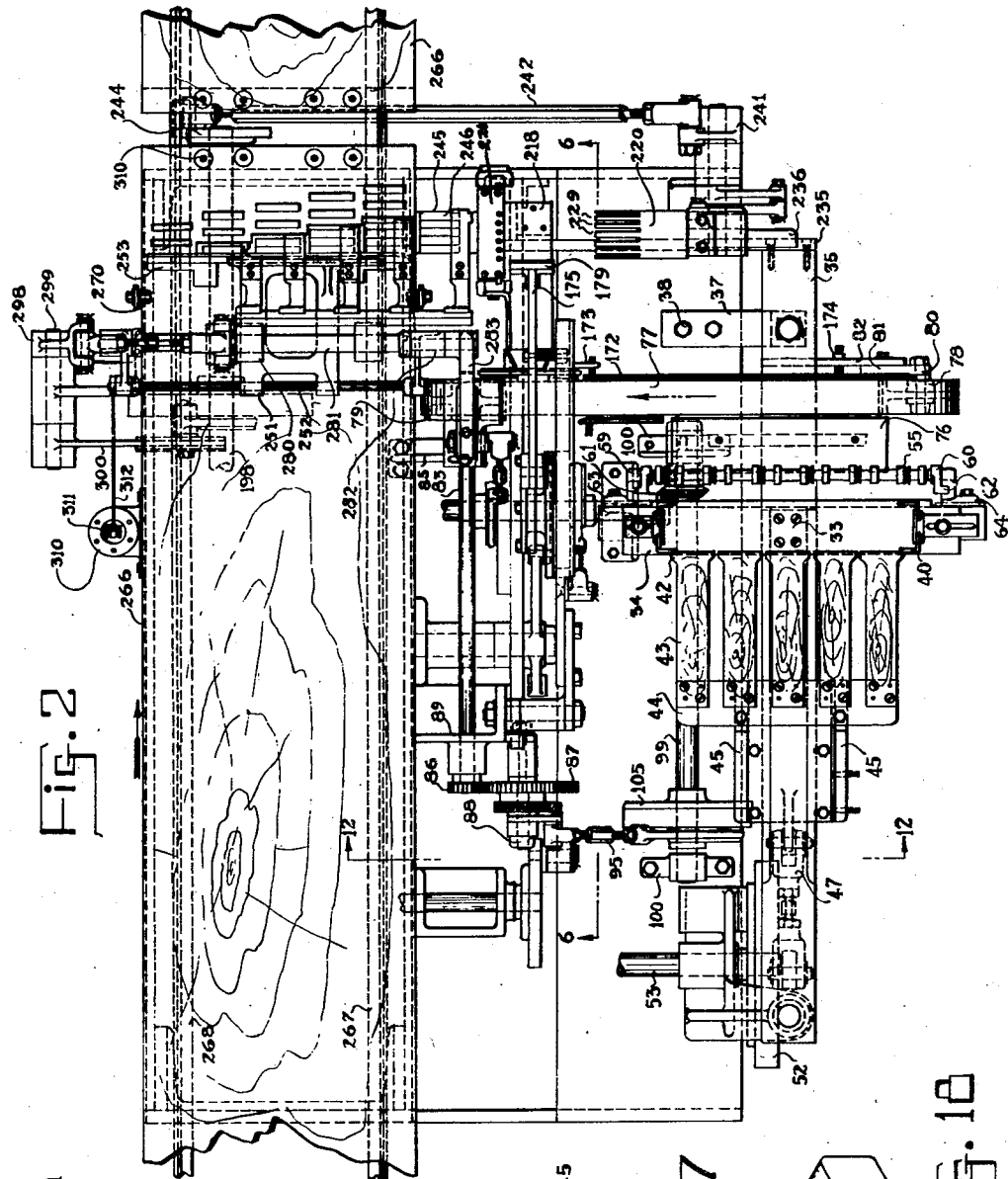
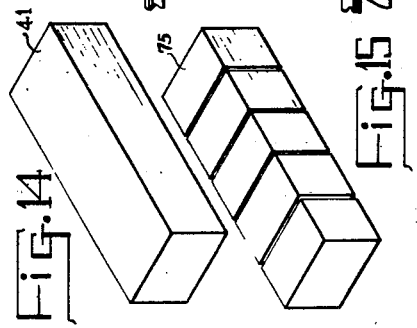
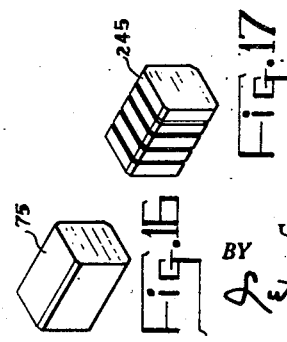
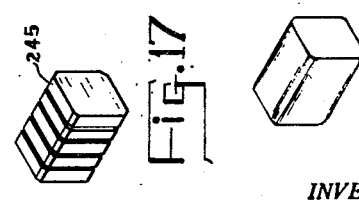
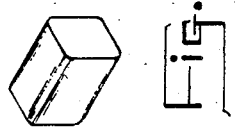
INVENTOR.
JOHN VAN BUREN
BY
Luther W Hawley
ATTY

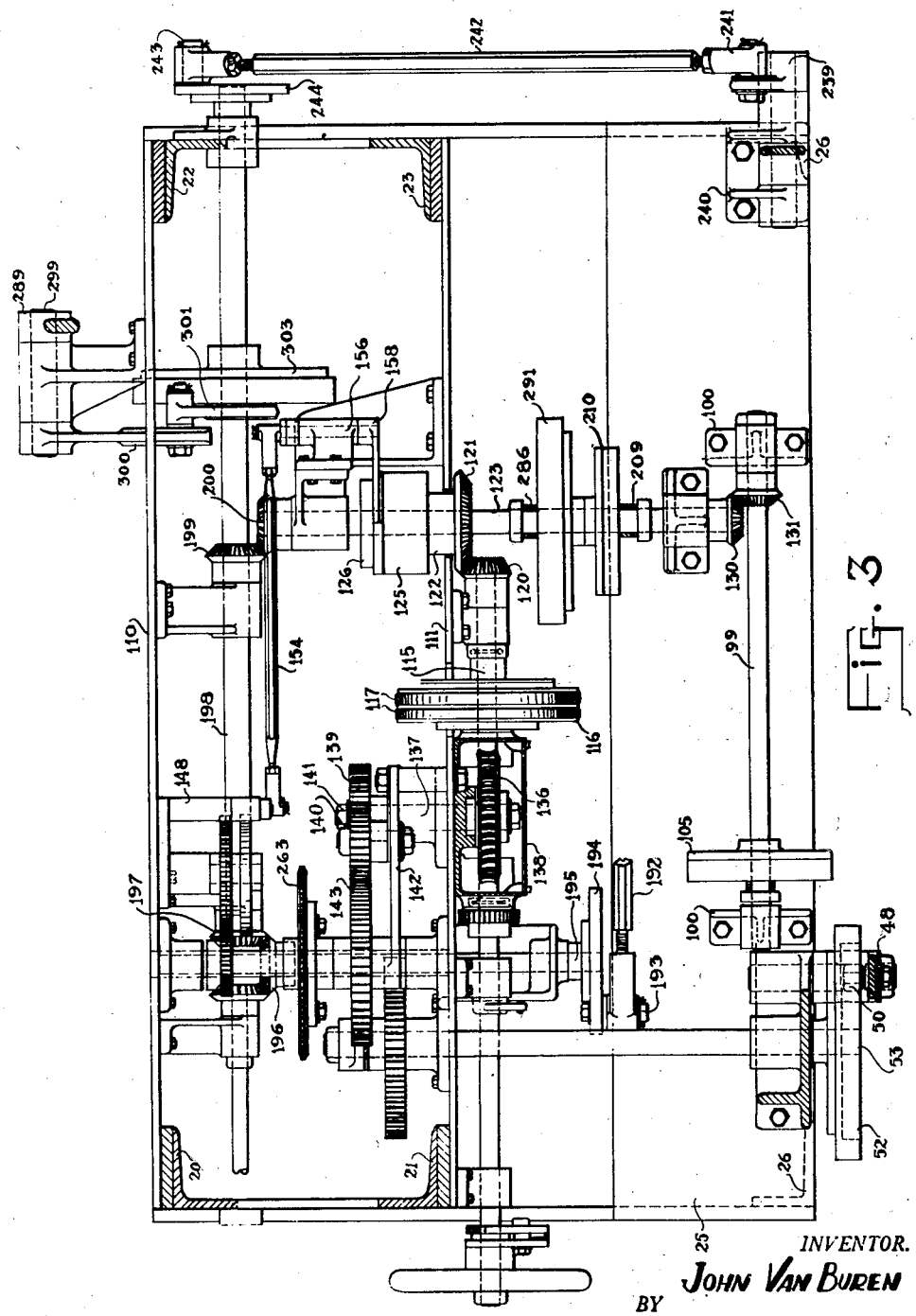

Sept. 4, 1951 J. VAN BUREN 2,567,041
MACHINE FOR CUTTING AND SPACING SOAP CAKES
Filed March 23, 1949 6 Sheets-Sheet 4
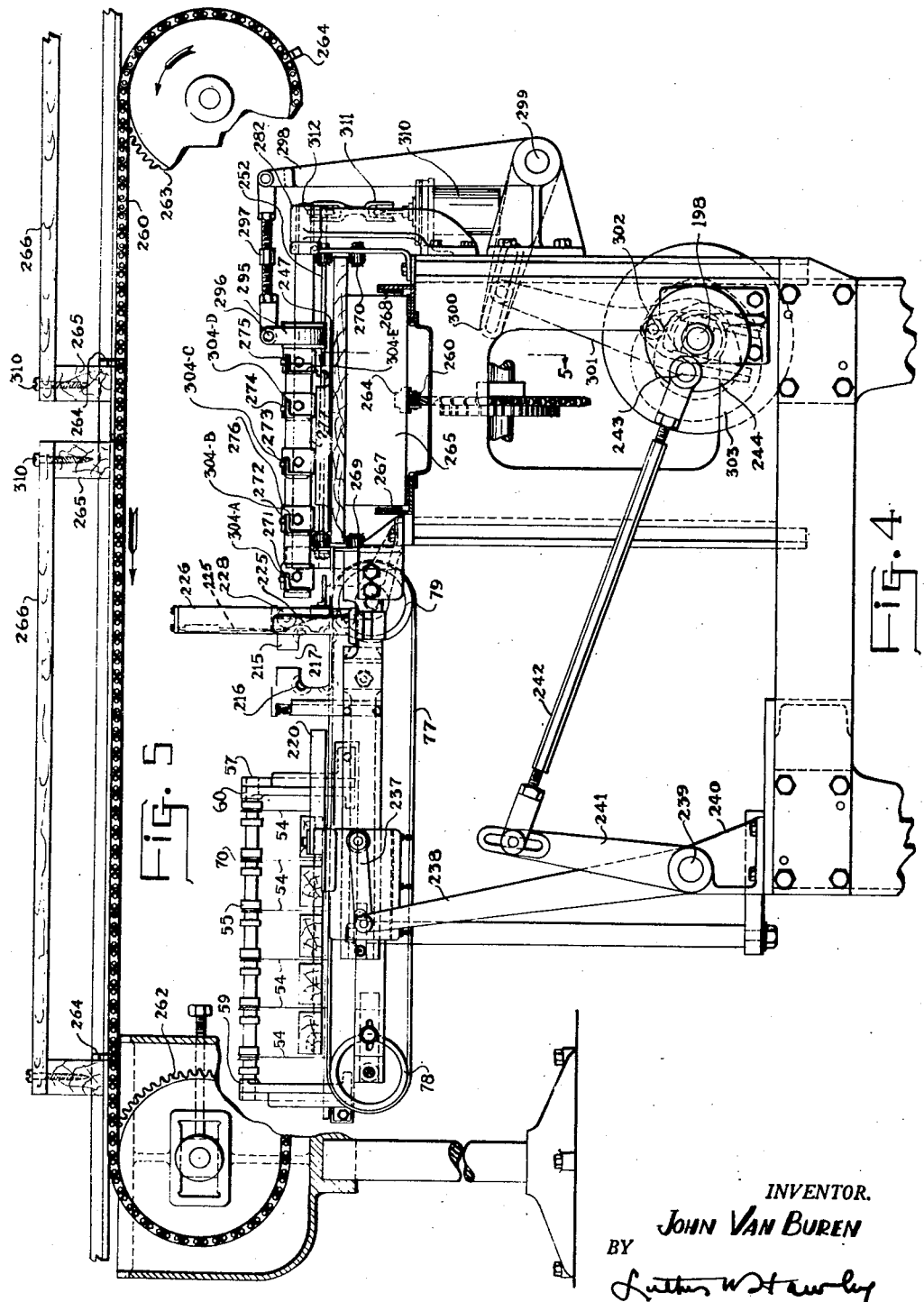
INVENTOR.
JOHN VAN BUREN
BY
Luther W Hawley
ATTY!

Sept. 4, 1951 J. VAN BUREN 2,567,041
MACHINE FOR CUTTING AND SPACING SOAP CAKES
Filed March 23, 1949 6 Sheets-Sheet 5
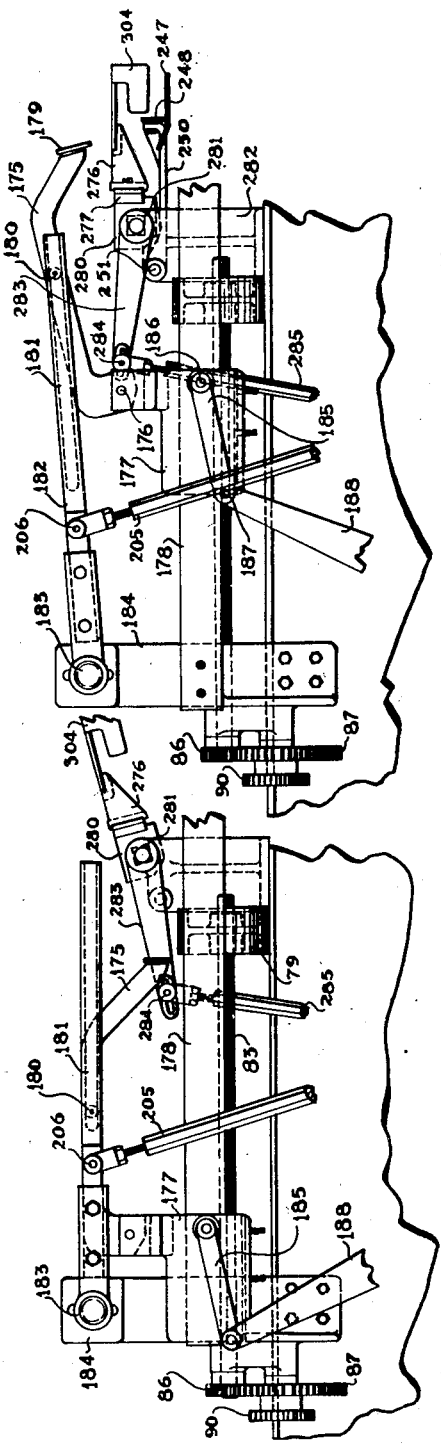
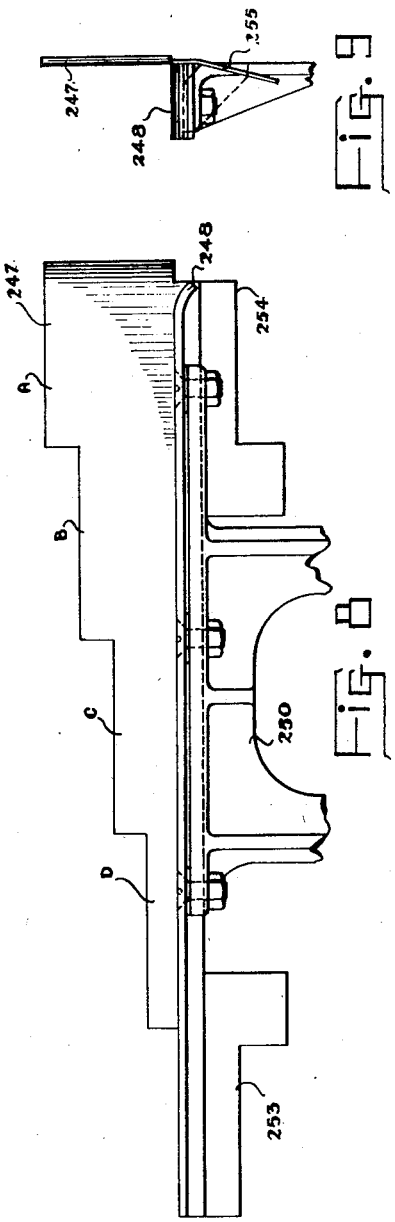
INVENTOR.
JOHN VAN BUREN
BY
ATTY.

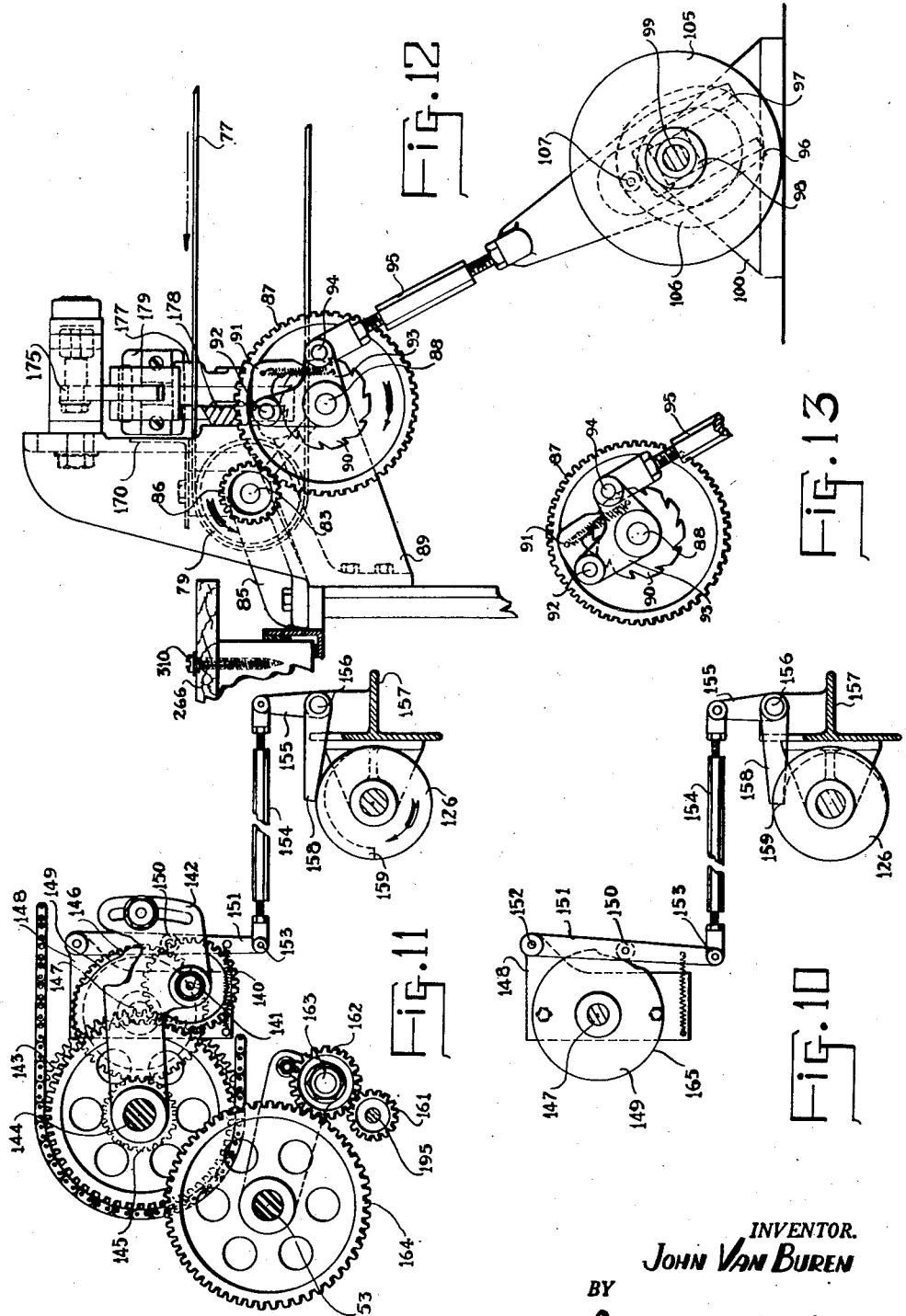

Patented Sept. 4, 1951

2,567,041

UNITED STATES PATENT OFFICE 2,567,041

MACHINE FOR CUTTING AND SPACING
SOAP CAKES

John Van Buren, Brooklyn, N. Y., assignor to The
Procter & Gamble Company, Cincinnati, Ohio,
a corporation of Ohio Application March 23, 1949, Serial No. 83,048

11 Claims. (Cl. 25—106)

This invention relates to a machine for cutting and spacing or spreading soap bars.

Soap bars are cut from strips or blocks of soap and are thereafter stamped with the trade-mark or trade-name of the soap and at times with the name of the manufacturer. However, soap bars, when first cut, are moist and sticky or gummy and stick to dies and the stamping operation cannot be efficiently carried out and the imprint is not clear and well defined.

This invention has for its salient object to provide means in a soap cutting machine for depositing the cut bars in spaced or separated relation on a tray or platform so that the bars will be exposed to air drying.

Further objects of the invention will appear from the following specification taken in connection with the drawings which form a part of this application, and in which Fig. 1 is a side elevation of a machine constructed in accordance with the invention;

Fig. 2 is a top plan view of the machine shown in Fig. 1;

Fig. 3 is a horizontal sectional elevation showing the driving connections for the various parts;

Fig. 4 is an end elevation of the machine shown in Fig. 2, looking toward the left in Fig. 2;

Fig. 5 is an enlarged detail elevational view taken substantially on line 5—5 of Fig. 4, looking in the direction of the arrows;

Fig. 6 is an elevational view, partly broken away, taken substantially on line 6—6 of Fig. 2, looking in the direction of the arrows;

Fig. 7 is a view similar to Fig. 6 but illustrating the feeding mechanisms in a different position of operation;

Fig. 8 is a top plan view, on an enlarged scale, showing the stepped platform on which the bars are deposited at one stage in the operation of the machine;

Fig. 9 is an elevational view taken at right angles to Fig. 8 showing the platform;

Fig. 10 is an elevational view, partly in section, showing the cam control for the clutch;

Fig. 11 is an elevational view showing the gear driving connections for the platform feeding conveyor and associated parts;

Fig. 12 is a sectional elevation, on an enlarged scale, taken substantially on line 12—12 of Fig. 2, looking in the direction of the arrows;

Fig. 13 is a fragmentary elevational view showing the pawl and ratchet for driving the belt conveyor and associated parts;

Fig. 14 is a perspective elevation showing the soap strip prior to the first cutting operation;

Fig. 15 is a view similar to Fig. 14 but showing the soap strip cut into five blocks after the first cutting operation;

Fig. 16 is a perspective elevation showing one of the blocks after the beveling or rounding operation has been completed;

Fig. 17 is a view similar to Fig. 16 but showing the block shown in Fig. 16 cut into five bars after the final operation; and Fig. 18 is a view similar to Fig. 16 but showing rounded corners.

The invention briefly described consists of a machine comprising a plurality of feeding and cutting mechanisms. The first cutting mechanism pushes a soap strip through wires, by means of which it is cut into a plurality of blocks, such as five blocks. These blocks are then fed laterally and each block has its four corners beveled or rounded and is thereafter pushed through another set of cutting wires, by means of which each block is cut into a plurality of smaller bars, such as five bars. After this cutting operation, the bars are fed onto a stepped platform (Fig. 8) and are successively pushed along this platform. The platform on its receiving end supports four of the five bars. The fifth bar is deposited on a moving support or tray. When these four bars are pushed longitudinally during the next operation of the feeding means, three of the bars will be retained on the platform and the fourth bar will be deposited on the moving support or tray. In the next feeding movement two of the bars will be retained on the platform and the third bar will be deposited on the moving platform or tray. This action is continued until all of the bars have been deposited on the moving platform or tray and the movement of this support is such that the bars will be deposited in spaced relation thereon, as shown in Fig. 2. After a support or tray has been filled with bars or has received its full number, the tray is removed and the next succeeding tray comes into action.

By depositing the bars in spaced relation on the support or tray, air has access to the top, ends and two faces of the bar, so that the bar will be dried on all surfaces except on the bottom surface on which it will be supported.

Further details of the invention will appear from the following description.

In the particular embodiment of the invention illustrated, the machine is mounted on a frame comprising a main body portion supported on angle iron pedestals 20, 21, 22 and 23 and an extension comprising a platform 25 supported on the main frame and on legs 26 (Fig. 3).

A supporting bar 30 is mounted on a post 31, which in turn is mounted in a bracket 32 supported on the platform 25 (Fig. 1). The other end of the supporting bar 30 has secured thereto at 33, a transverse bar 34, and to the transverse bar there is secured a bar 35, this bar being also supported on a post 36 which is mounted at its lower end in a bracket 37 secured at 38 to the platform 25.

A hopper for soap strips, shaped as shown in Fig. 14, is mounted on and extends upwardly from the transverse bar 34, the hopper being designated as 40. The soap strips 41 are stacked in the chute 40 and the lower strip is engaged by the forward ends 42 of a series of parallel pushers 43, which are secured at their rear ends to a transverse frame 44. The frame 44 is secured to a slide frame 45, which is slidably mounted on the supporting bar 30 and is moved alternately, forwardly and backwardly, in the following manner.

A lug 46 is secured to and extends downwardly from the frame 45 and is connected by a link 47 to the upper end of a lever arm 48, which is mounted at its lower end on a fixed pivot 49, and intermediate its ends has a cam follower or roller 50 which is disposed in a cam groove 51 of a cam 52 mounted on a shaft 53 which is driven in a manner herinafter described. As the shaft and cam rotate, the lever arm 48 will be oscillated on its pivot 49 and will cause the slide frame 45 and pushers 43 to reciprocate and on each forward movement to push the button strip in the hopper forwardly through a soap cutting frame which will now be described.

The soap cutting frame consists primarily of a plurality of vertically extending wires 54, each wire being mounted at its ends on or secured to spools 55. These are shown particularly in Figs. 1, 2 and 4. The spools 55 are mounted on a spindle 57 carried by brackets 59 and 60, which in turn are mounted for vertical adjustment in guideways 61 and 62 carried by brackets 63 and 64. The brackets 63 and 64 are secured to the transverse bar 34.

As the pushers 43 are actuated to the right, viewing Figs. 1 and 2, the soap strip 41 at the bottom of the hopper will be pushed through the wires and will be cut into five blocks 75, as shown in Fig. 15. These blocks will be pushed by the pushers across a supporting plate 76 and will be deposited on a belt conveyor 77 which is mounted at its ends on pulleys 78 and 79. The pulley 78 is carried by a stud shaft 80, which in turn is mounted in a bracket 81 adjustably carried by a bar 82, which is secured to the bar 35. The pulley 79 is secured to a shaft 83 mounted in suitable bearings 89 and 85 and having secured thereto, at the end remote from the pulley 79, a spur gear 86. The gear 86 meshes with a gear 87 carried by a shaft 88, these gears and the shaft 83 and 88 being mounted respectively in brackets 89 and 85 secured to the machine frame (Fig. 12). The shaft 88 has also mounted thereon a ratchet wheel 90, which is engaged by a pawl 91 pivoted at 92 to a bell crank lever 93, which is pivotally mounted on the shaft 88. The other arm of the bell crank lever is connected at 94 to the upper end of a pitman or link 95, the other end of this link being forked and having two downwardly extending bifurcations 96 and 97 which slidably engage a square block 98 swiveled on a shaft 99 supported in brackets 100 from the platform 25.

The link 95 is actuated by a cam 105 mounted on the shaft 99, this cam having a cam groove 75 106 in which is positioned a follower or roller 107 carried by the link 95.

The shaft 99 is driven in the following manner, as shown particularly in Figs 1 and 3. The main frame of the machine, in addition to the four uprights 20, 21, 22 and 23, has side frame members 110 and 111, and on the frame member 111 there is mounted in suitable bearings the main drive shaft 115. This shaft has secured thereto a pulley 116, which is connected by belts 117 to a pulley 118 mounted on a shaft 119 of a motor M. If desired, a chain and sprocket drive could be used instead of the belt and pulley drive. The shaft 115 has mounted on one end thereof, a bevel gear 120, which meshes with a gear 121 carried by a hub 122 rotatably mounted on a shaft 123. The hub 122 has connected thereto one-half 125 of a single revolution clutch, the other half 126 of the clutch being secured to the shaft 123. When the two clutch members 125 and 126 are connected together in driving relation, the shaft 123 is driven, thereby driving the bevel gear 130 disposed at one end thereof and meshing with a bevel gear 131 mounted on the shaft 99.

The clutch 125, 126 is operated in the following manner, attention being directed particularly to Figs. 1, 3, 10 and 11. The shaft 115 which is driven by the belt connection to the motor M, as above described, has secured thereto a worm 135 which meshes with a worm gear 136 mounted on a shaft 137, which in turn is mounted in a casing 138. Shaft 137 also has secured thereto a spur gear 139 which meshes with a gear 140 mounted on a shaft 141 carried by a bracket 142. The gear 140 on the shaft 141 meshes with a gear 143 on a shaft 144, about which the bracket 142 pivots. Shaft 144 also has mounted thereon a gear 145 which meshes with a gear 146 carried by a shaft 147 mounted in a bracket 148. Gear 146 has secured thereto a cam 149, which is engaged by a cam follower or roller 150 carried by a lever 151 mounted on a fixed pivot 152 and connected at its lower end at 153 to a link 154. The other end of the link 154 is connected to an arm 155 secured to a shaft 156 carried by a bracket 157. On the other end of the shaft 156 is secured an arm 158 which is adapted to engage a notch 159 in the clutch member 126. The clutch 125 and 126 is a single revolution clutch and when the clutch member 126 is engaged by the arm 158 the two clutch members 125 and 126 are declutched. However, when the cam follower 150 engages the concentric portion 165 of the cam 149, the arm 158 will be moved out of engagement with the notch 159 of the clutch member 126, thus permitting the two clutch members to be clutched in driving relation. Thereupon the shaft 123 will be driven and through the bevel gear connections 130 and 131 will drive the shaft 99.

When the shaft 99 is clutched in through the clutch members 125 and 126, the pitman 95 will actuate the pawl 91 under the action of the cam 105 and will feed the belt 77 in a step by step motion, thus feeding the blocks 75 disposed on the belt in the direction of the arrows shown in Figs. 2 and 12. The blocks will be fed until the end block 75 engages a stop 170 carried by a bracket 85. When the end block has reached this position, it is fed at right angles to the direction of feed on the belt by the feeding mechanism illustrated particularly in Figs. 1, 6 and 7. The blocks 75 are fed in the manner hereinbefore described by the pushers 43 onto the belt 77 and are guided at one edge of the belt by a bar 172 which is mounted in brackets 173 and 174. The bar 172 is adjustable in the brackets toward and away from the belt.

This feeding mechanism comprises a pusher bar 175 which is pivoted at its rear end at 176 to a slide block 177, which is slidably mounted on and has a dovetail connection to a bar 178 (see Fig. 12). The pusher bar 175 has a head or plate 179 at the forward end thereof engageable with the end block 75. Intermediate its ends the pusher bar 175 is fulcrumed at 180 in a channel 181 formed in a bar 182 pivoted at 183 to a bracket 184. The block 177 is reciprocated forwardly and rearwardly on the bar 178 in the following manner. A link 185 is pivoted at 186 to the block 177 and at the other end is pivoted at 187 to an arm 188. The arm 188 is pivoted at 190 and is connected to an arm 191 extending beyond the pivot 190. The other end of the arm 191 is connected to a link 192, the other end of the link being pivoted at 193 to a disk 194 mounted on a shaft 195.

Shaft 195 has secured to the other end thereof a bevel gear 196, which meshes with a bevel gear 197 carried by a shaft 198 (Fig. 3). Shaft 198 has also secured thereto a bevel gear 199, which meshes with a bevel gear 200 carried by the shaft 123. Thus, when the shaft 123 is clutched in, the shaft 195 will be driven, actuating the disk 194, link 192, lever 191, 188 and link 185. In this manner the slide block 177 will be reciprocated and the pusher bar 175 will be moved forwardly and backwardly.

The shaft 195 has mounted thereon a gear 161 which meshes with a gear 162 on a stub shaft 163. Gear 162 meshes with a gear 164 mounted on shaft 53 hereinbefore described.

During its forward movement the pusher bar 175 will be held in the position shown in Fig. 6 to engage and feed the end block 75 which is disposed at the delivery end of the conveyor 77. After the block has been fed, the pusher bar is elevated to the position shown in Fig. 7 and is held in this position during its retractive movement. This is accomplished by raising the bar 182 about its pivot 183 in the following manner. The link 205 is pivoted at 206 to the bar 181 and the opposite end of this link is bifurcated, as shown at 207 and 208, these bifurcated ends being disposed in slidable engagement with a block 209 mounted on the shaft 123 (Fig. 3). This shaft has also mounted thereon, a cam 210 having a cam groove engaged by a follower 211 carried by the bifurcated end of the link 205. The cam 210 is so designed that during the forward movement of the pusher bar 175 the link 205 will not be actuated by the cam but will hold the bar 182 in horizontal position. However, after the pusher bar 175 has performed its feeding movement and has fed the end block 75 from the conveyor belt 77, the bar 182 will be raised to the position shown in Fig. 7, thus by the action of the fulcrum 180, raising the pusher bar during its retractive motion.

During its feeding movement under the action of the pusher bar 175, the end block 75 is fed through a corner trimming frame 215 (Fig. 4) and in the corners of this frame are mounted cutters 216 by means of which the longitudinal corners of the block 75 will be beveled in the manner shown in Fig. 16 or rounded as shown in Fig. 18. During this feeding movement the head or plate 179 of the pusher bar will engage the block and the main body portion of the pusher bar 175 will pass through the slot or opening 217 at the top of the corner trimming frame 215. The block, after being fed through the corner trimming frame 215, will be deposited on a platform 218, whereupon the block will be engaged and fed by a pusher 220 (Figs. 2 and 4). During this feeding movement the soap is again cut by a plurality of vertical wires 225 mounted in a frame 226. The forward feeding end of the pusher 220 is slotted, as shown particularly in Fig. 2 at 229, in order to receive the wires 225.

The pusher 220 is actuated in the following manner, attention being directed to Figs. 1, 2, 3 and 4. As shown in Fig. 2, the bar 35 has secured to the end thereof a bar 235 on which is slidably mounted a block 236. This block has connected thereto the pusher 220 and also has pivoted thereto a link 237, the other end of the link being pivoted to an arm 238 mounted on a shaft 239 carried by a bracket 240. The shaft 239 has secured thereto an arm 241, to which is pivoted one end of a link 242, the other end of the link being eccentrically pivoted at 243 to a disk 244 mounted on the outer end of the shaft 198. The driving connections for the shaft 198 have been hereinbefore described. As this shaft is rotated, the disk 244 will operate the link 242 and through the arms 241 and 238 and link 237 will reciprocate the slide 236 and the pusher 220 carried thereby.

The pusher 220 will push the block 75 through the wires 225 and will cut the block 75 into a plurality of bars or five bars 245. These bars will be fed by the pusher 220 onto a bridge 246, which is preferably hinged or pivoted at 246A and from which they are then fed onto a stepped platform 247. This platform has sections A, B, C and D, as shown in Fig. 8, which decrease in width, the section A being adapted to support four bars, B being adapted to support three bars, and C and D two bars and one bar respectively. The platform 247 has a wall 248 along one edge thereof.

The platform 247 is carried by a bracket 250, which is fixed at 251 to a rod 252. The wall 248 has secured thereto and extending rearwardly therefrom, a pair of plates 253 and 254, which are bent upwardly, as shown at 255 in Fig. 9.

Beneath the platform 247 is mounted a conveyor chain 260, which is supported at its ends on sprocket wheels 262 and 263. The sprocket wheel 263 is mounted on the shaft 144, which is driven in the manner hereinbefore described. The sprocket chain 260 has secured thereto lugs 264 which engage downwardly extending bases 265 on traveling supports or trays 266. These trays are constantly fed by the conveyor chain beneath the stepped platform 247 and the soap bars 245 are deposited on the trays or traveling supports 266 in spaced relation in the following manner and as shown in Fig. 2. From the showing in Fig. 4 it will be seen that the bases 265 are guided at their lower corners in angle iron frame members 267 and 268 and the trays are also guided at their outer edges between rollers 269 and 270.

The feeding means for feeding the bars 245 from the bridge 246 to the stepped platform 247 will now be described, attention being directed particularly to Figs. 1, 2, 4, 6 and 7. This feeding means comprises a plurality of angle arms 271, 272, 273, 274 and 275, which are carried by brackets 276, which in turn are mounted on a bar 277. This bar is carried by brackets 280 mounted on a shaft 281 supported in brackets 282. The shaft 281 has also connected thereto and extending rearwardly therefrom, an arm 283, to which is pivoted at 284 the upper end of a link 285. The lower end of the link 285 is bifurcated and the bifurcated ends slidably engage a block 286 swiveled on the shaft 123. The bifurcated lower end of the link 285 has mounted thereon a cam follower 290 which engages a cam groove in a cam 291 mounted on the shaft 123.

The mechanism above described in connection with the operation of the feeding arms 271 to 275 operates to move these arms about the shaft 281 as an axis from the inoperative position shown in Fig. 6 to the operative position shown in Fig. 7. The feeding movement of the arms 271 to 275 is accomplished in the following manner. The bar 277 which carries the arms is connected at one end to a bracket 295, to which at 296 is a pivotal link 297, the other end of the link being connected to the upper end of an arm 298 mounted on a shaft 299. On the shaft 299 is also mounted an arm 300, which is pivoted at its other end to a link or pitman 301. At the lower end of the link 301 is a cam follower 302 which is disposed in a cam groove in a cam 303 mounted on the shaft 198.

Each of the arms 271 to 275 inclusive has on its outer end an L-shaped, downwardly extending finger 304 (see Figs. 2 and 7). These fingers, designated as 304A, 304B, 304C, 304D and 304E, are graduated in width in accordance with the number of bars to be fed thereby, namely, five, four, three, two, one.

The feeding arms 271 to 275 operate in the following manner. When the arms are in operative position, as shown in Fig. 7, the L-shaped fingers 304 are disposed above the stepped platform 247 and the arm 271 will be disposed above the platform 246. As the arms 271 to 275 inclusive are moved to the right, viewing Fig. 4, by the action of the link 297, arm 298, arm 300 and link 301 under the action of the cam 303 the five bars 245 which are deposited on the bridge 246 will be moved to the right. Four of these bars will be positioned in the section A of the platform 247 and the fifth bar will be positioned on the traveling platform or tray 266. It should be understood that this tray is moving continuously and, therefore, when the next set of bars 245 is fed by the arm 271, the fifth bar which is deposited also on the tray 266 will be spaced from the bar first deposited thereon.

After each feeding movement, the arms 271 to 275 are raised to the position shown in Fig. 6 and are held in this position as they are retracted to their initial position. They are then lowered by the cam action above described to the position shown in Fig. 7. On the next feeding movement, a new set of bars 245 will be fed by the arm 271 and the four bars which were left on the section A of the platform 247 by the previous feeding movement will be fed by the arm 272 from the section A to the second B, the section B being dimensioned to support three bars. The fourth bar will be deposited on the tray 266. The successive feeding movements of the arms will successively deposit one bar at a time on the tray 266 and due to the continuous movement of the tray the bars will be deposited in spaced relation, as shown in the plan view in Fig. 2.

The pivotal movement of bracket 250, and platform 247 carried thereby, has a controlled downward velocity provided by dash pot 310 which is connected to pivot shaft 252 by link 311 and lever arm 312.

The platform 247 is pivotally supported in the manner hereinbefore described in order to permit the platform to be raised to permit the passage of the trays 266 therebeneath. These trays have screws 310 projecting upwardly therefrom, which engage the plates 255 which extend rearwardly of the platform and cause the platform to tilt momentarily as the screws are passing therebeneath. The hinging of the platform 247 and of bridge 246 also takes care of uneven or warped trays.

Operation

As hereinbefore explained, the strips of soap shown in Fig. 14 at 41 are placed in the hopper 40 and the lower strip in the hopper is engaged by the outer ends of the pushers 43 and is fed through the cutting wires 54 onto the belt 77. The five blocks 75 (Fig. 15) are then fed laterally by the belt against the end stop 170, whereupon the forward block in the direction of feed is engaged and fed by the pusher bar 175 and head 179 through the corner trimmer 215, by means of which the corners are beveled or rounded, in the manner shown in Fig. 16. Thereupon, the block 75, which has been fed in the manner described, will be engaged by the pusher 220 and fed through the cutting wires 225, thus cutting the block 275 into five bars 245, as shown in Fig. 17. The bars 245 will be deposited by the pusher 220 on the bridge 246. During the feeding movement by the pusher 220, the arms 271 to 275 will be disposed in raised position, as shown in Fig. 6, to permit the bars 245 to be fed onto the bridge 246.

After the bars 245 have been so fed, the arms 271 to 275 will be lowered to the position shown in Fig. 7 and will be moved laterally to engage the bars 245 and feed them onto the platform 247. As the five bars are fed by the arm 271, the outside bar will be deposited on the moving tray 266, since the section A of platform 247 is only wide enough to support four bars. The arms 271 to 275 are then raised and retracted to their initial position, as shown in Fig. 4, and the next set of five bars 245 is fed by the arm 271 to the section A of the platform and the four bars deposited on section A by the preceding operation will be fed forwardly on the platform 247, three of them being positioned on the section B and the fourth being deposited on the moving tray 266. This operation is repeated and by the successive operations the bars 245 will be positioned in spaced relation on the tray 266 in the manner shown in Fig. 2. The spacing of the bars on the trays can be regulated by varying the rate of movement of the trays.

It will be noted that there is a gap between adjacent trays 266 and the clutch control cam 149 and clutch 125, 126 are so designed that the shaft 123 is declutched or disconnected from the drive as one tray 266 moves out of bar receiving position and the next tray moves into position to receive the bars. When shaft 123 is disconnected the driving connections for pushers 43, belt 77, pusher bar 175, pusher 220 and arms 271 to 275 are all disconnected and these feeding operations are interrupted as one tray 266 moves out of receiving position and the next tray moves into receiving position.

The bars deposited in the manner described, by reason of their spaced relation, are exposed to the air, with the exception of the bottom thereof, and are, therefore, readily dried.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. In a machine of the character described, a movable support, a platform above and extending across the support and having a plurality of sections successively diminishing in width across said support, a plurality of means above the platform for feeding and spreading a plurality of soap bars into spaced rows of side by side bars on said platform, said soap bar feeding and spreading means comprising a plurality of pusher arms graduated in length across the support to engage and feed a diminishing number of bars in the successive rows to and across the platform.

2. In a machine of the character described, a cutter comprising a plurality of cutting elements arranged side by side, means for feeding a soap block through said cutter to cut the block into a plurality of sections or bars, a movable support, means for moving said support, a platform above said support, said platform having a plurality of sections successively diminishing in width across said support, and successively acting means for feeding said bars from section to section on said platform and depositing successive bars on the platform.

3. In a machine of the character described, a cutter comprising a plurality of cutting elements arranged side by side, means for feeding a soap block through said cutter to cut the block into a plurality of sections or bars, a movable conveyor, trays mounted on said conveyor end to end in spaced relation, a platform above the path of movement of said trays, said platform having a plurality of sections successively diminishing in width from the receiving end of the platform, successively acting means for feeding the bars from section to section on said platform, and means for interrupting the bar feeding means when one tray is filled and another tray moves into receiving position.

4. In a machine of the character described, a cutter comprising a plurality of cutting elements arranged side by side, means for feeding a soap block through said cutter to cut the block into a plurality of sections or bars, a movable support, means for moving said support, a platform above said support, said platform having a plurality of sections successively diminishing in width across said support to the extent of the width of a bar, the section at the receiving end of the platform being dimensioned in width to receive one less than the number of bars fed thereon, and successively acting means for feeding said bars from section to section on said platform.

5. A soap cutting and spacing machine comprising a cutter comprising a plurality of cutting elements arranged side by side, means for feeding a soap strip through said cutter, a conveyor positioned to receive the blocks from the cutter and to convey the blocks to the next station, means engageable successively with the advance end block of said series to feed said block, means in the path of said feeding movement for beveling or rounding the corners of said block, a second cutter comprising a plurality of cutting elements arranged side by side, a stepped platform having successive sections decreasing in width, means for feeding the beveled block through said second cutter, successively acting feeding means for feeding the bars along said platform, and a movable support disposed beneath said stepped platform.

6. A soap cutting and spacing machine comprising a cutter comprising a plurality of cutting elements arranged side by side, means for feeding a soap strip through said cutter, a conveyor positioned to receive the blocks from the cutter and to convey the blocks to the next station, means engageable successively with the advance end block of said series to feed said block, means in the path of said feeding movement for beveling or rounding the corners of said block, a second cutter comprising a plurality of cutting elements arranged side by side, a stepped platform having successive sections decreasing in width, means for feeding the beveled or rounded block through said second cutter, successively acting feeding means for feeding the bars along said platform, a movable conveyor below said platform, supporting trays on said conveyor, and means for interrupting the operation of all of said aforesaid soap strip, block and bar feeding means when one tray is filled and another tray moves into bar receiving position.

7. In a machine of the character described, a movable support, trays mounted on said support in spaced, end to end relation, a platform disposed above the path of movement of said trays, and a plurality of successively acting means for feeding a plurality of soap bars, side by side, on to and along said platform, said platform decreasing in width from end to end and across the path of movement of the support and trays.

8. In a machine of the character described, a conveyor, a plurality of trays arranged end to end in spaced relation on said conveyor, means for driving said conveyor, a platform mounted above the path of movement of said trays and extending transversely across said path, said platform comprising a plurality of sections diminishing in width across the platform from the receiving end thereof, means for feeding a plurality of soap bars, arranged side by side, onto and from section to section of said platform, and means for interrupting the operation of said feeding means when one tray on the conveyor moves out of receiving position and the next adjacent tray moves into receiving position.

9. A soap cutting and spacing machine comprising a cutter comprising a plurality of cutting elements arranged side by side, means for feeding a soap strip through said cutter, a conveyor positioned to receive the blocks from the cutter and to convey the blocks to the next station, means engageable successively with the advance end block of said series to feed said block, a cutter comprising a plurality of cutting elements arranged side by side, means for feeding the soap block through said cutter to cut the block into a plurality of sections or bars, a movable support, means for moving said support, a platform above said support, said platform having a plurality of sections successively diminishing in width across said support, and successively acting means for feeding said bars from section to section on said platform and depositing successive bars on the moving support.

10. A soap cutting and spacing machine comprising means for simultaneously cutting a soap strip into a plurality of blocks arranged side by side, means engageable successively with an end block of the series to feed said block, means in the path of said feeding movement for beveling the corners of said block, a cutter comprising a plurality of cutting elements arranged side by side, means for feeding the soap block through said cutter to cut the block into a plurality of sections or bars, a movable support, means for moving said support, a platform above said support, said platform having a plurality of sections successively diminishing in width across said support, and successively acting means for feeding said bars from section to section on said platform and depositing successive bars on the moving support.

11. A soap cutting and spacing machine comprising means to feed a soap block, means in the path of said feeding movement for beveling the corners of said block, a cutter comprising a plurality of cutting elements arranged side by side, means for feeding the soap block through said cutter to cut the block into a plurality of sections or bars, a movable support, means for moving said support, a platform above said support, said platform having a plurality of sections successively diminishing in width across said support, and successively acting means for feeding said bars from section to section on said platform and depositing successive bars on the moving support.

JOHN VAN BUREN.

REFERENCES CITED

The following references are of record in the file of this patent:

UNITED STATES PATENTS

| Number | Name | Date |
| --- | --- | --- |
| 671,363 | Williams et al. | Apr. 2, 1901 |
| 1,512,703 | Madden | Oct. 21, 1924 |
| 1,574,224 | Wilcox | Feb. 23, 1926 |
| 1,627,364 | Webster | May 3, 1927 |
| 1,627,391 | House | May 3, 1927 |
| 2,090,129 | Kimball et al. | Aug. 17, 1937 |